United States Patent [19]

Nishikawa et al.

[11] Patent Number: 5,276,132

[45] Date of Patent: Jan. 4, 1994

[54] LIQUID CRYSTAL ALIGNING AGENT AND ALIGNING AGENT-APPLIED LIQUID CRYSTAL DISPLAY DEVICE

[75] Inventors: Michinori Nishikawa; Tsuyoshi Miyamoto; Yasuaki Yokoyama; Yasuo Matsuki, all of Yokohama, Japan

[73] Assignee: Japan Synthetic Rubber Co., Ltd., Tokyo, Japan

[21] Appl. No.: 847,758

[22] Filed: Mar. 4, 1992

[30] Foreign Application Priority Data

Mar. 11, 1991 [JP] Japan .................................. 3-69388
May 17, 1991 [JP] Japan ................................. 3-140650

[51] Int. Cl.$^5$ ...................... C08G 73/10; C09K 19/00; G02F 1/133
[52] U.S. Cl. ...................... 528/353; 528/125; 528/126; 528/128; 528/170; 528/172; 528/173; 528/176; 528/183; 528/185; 528/188; 528/220; 528/224; 528/229; 528/350; 528/351; 428/1; 359/36; 359/93; 359/103; 359/104
[58] Field of Search ................ 350/350; 528/125, 126, 528/128, 170, 172, 173, 176, 183, 185, 188, 220, 224, 229, 350, 353; 428/1, 335

[56] References Cited

FOREIGN PATENT DOCUMENTS 0259761  3/1988  European Pat. Off. .
0313407  4/1989  European Pat. Off. .
0365855  5/1990  European Pat. Off. .
62-297819 12/1987 Japan .
63-259515 10/1988 Japan .

OTHER PUBLICATIONS

CA 116(20):204628j, Yokoyama et al.

Primary Examiner—John Kight, III
Assistant Examiner—P. Hampton-Hightower
Attorney, Agent, or Firm—Oblon, Spivak, McClelland, Maier & Neustadt

[57] ABSTRACT

A liquid crystal aligning agent containing a polymer selected from the group consisting of a polyamic acid having a steroidal skeleton and an imidized product thereof; and a liquid crystal display device to which the liquid crystal aligning agent is applied.

16 Claims, No Drawings

LIQUID CRYSTAL ALIGNING AGENT AND ALIGNING AGENT-APPLIED LIQUID CRYSTAL DISPLAY DEVICE

DETAILED DESCRIPTION OF THE INVENTION

The present invention relates to a liquid crystal aligning agent and a liquid crystal display device to which the liquid crystal aligning agent is applied. More specifically, it relates to a liquid crystal aligning agent which gives excellent liquid crystal alignment and a large pretilt angle, and a liquid crystal display device to which the liquid crystal aligning agent is applied.

There is conventionally known a liquid crystal display device (TN-type display device) having a sandwich structure in which a nematic liquid crystal having positive dielectric anisotropy is sandwiched between substrates provided with transparent electrode and a liquid crystal-aligning film formed of polyimide, etc., and having a TN liquid crystal cell in which the major (parallel) axis of liquid crystal molecules can be continuously twisted at 90 degrees between the substrates. The alignment of liquid crystal in this TN-type display device is controlled by a liquid crystal-aligning film which has been subjected to a rubbing treatment.

The above TN-type display device is inferior in contrast and viewing angle dependence. Therefore, an SBE (super twisted birefringence effect) display device and an SH (super homeotropic) display device, which are excellent in contrast and viewing angle dependence, have been recently developed. In the SBE display device there is used a blend of a nematic liquid crystal as liquid crystal with a chiral agent which is in optically active substance, and there is utilized a birefringence effect produced by continuously twisting the major axis of liquid crystal molecules at at least 180 degrees between the substrates. The SH display device is actuated by a simple matrix drive in which dielectric anisotropy of liquid crystal molecules vertically aligns negative liquid crystal, and the molecules is tilted by applying a voltage.

However, when the SBE display device has a liquid crystal-aligning film formed of polyimide, etc., the liquid crystal cannot be twisted beyond 180 degrees since the pretilt angle of the liquid crystal-aligning film is small, and it is difficult to obtain a required display function.

For this reason, the SBE display device at present involves a problem in that it is required to use a liquid crystal-aligning film formed by oblique evaporation of silicon dioxide in order to align liquid crystal and as a result the production step is complicated.

Further, the SBE display device entails the following requirements to vertically align liquid crystal: it is required to use a substrate on which silicon dioxide is deposited by oblique evaporation, or the substrate has to be treated with a fluorine-containing surfactant or a coupling agent having a long-chain alkyl group. When oblique evaporation is carried out, the production step is too complicated to achieve mass production. When the surfactant or coupling agent is used, the resultant liquid crystal display device is inferior in reliability.

It is an object of the present invention to provide a novel liquid crystal aligning agent.

It is another object of the present invention to provide a liquid crystal aligning agent which gives excellent liquid crystal alignment and a large pretilt angle.

It is further another object of the present invention to provide a liquid crystal aligning agent suitable particularly for forming a liquid crystal-aligning film of SBE and SH display devices.

It is still further another object of the present invention to provide an SBE display device and an SH display device each of which is provided with a liquid crystal-aligning film formed from the liquid crystal aligning agent of the present invention.

It is yet another object of the present invention to provide a use of a polyamic acid having a steroidal skeleton or an imidized product thereof as liquid crystal aligning agent.

Further, it is another object of the present invention to provide a use of the liquid crystal aligning agent of the present invention as a liquid crystal aligning agent for an SBE display device and an SH display device.

The above objects and advantages and other objects and advantages of the present invention will be apparent from the following description.

According to the present invention, first, the above objects and advantages of the present invention are achieved by a liquid crystal aligning agent containing a polymer selected from the group consisting of a polyamic acid having a steroidal skeleton and an imidized product thereof.

The polymer in the liquid crystal aligning agent of the present invention has its characteristic feature in that it has bulky steroidal skeleton which has a low degree of freedom in rotation.

As the above polymer, the following polymers (1) to (3) are preferred.

(1) A polymer (to be referred to as "specific polymer I" hereinafter) formed by reacting a tetracarboxylic dianhydride (to be referred to as "compound I" hereinafter) of the formula (I),

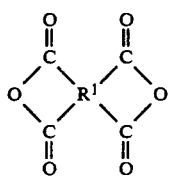

(I)

wherein $R^1$ is a tetravalent organic group, with a diamine compound which at least contains a diamine (to be referred to as "compound II" hereinafter) of the formula (II),

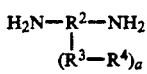

(II)

wherein $R^2$ is a trivalent or tetravalent organic group, $R^3$ is a divalent organic group, $R^4$ is a monovalent organic group having a steroidal skeleton, and a is 1 or 2, or an imidized product (to be referred to as "specific polymer II" hereinafter) of the specific polymer I.

(2) A polymer (to be referred to as "specific polymer III") formed by reacting the tetracarboxylic dianhydride of the formula (I), a diamine (to be referred to as "compound III" hereinafter) of the formula III,

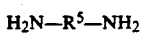

(III)

wherein $R^5$ is a divalent organic group, and a monoamine (to be referred to as "compound IV" hereinafter) of the formula IV,

(IV)

wherein $R^6$ is a divalent organic group, $R^7$ is a monovalent organic group having a steroidal skeleton, and b is 0 or 1, or an imidized product (to be referred to as "specific polymer IV" hereinafter) of the specific polymer III.

(3) A polymer (to be referred to as "specific polymer V" hereinafter) having a recurring unit of the formula (V),

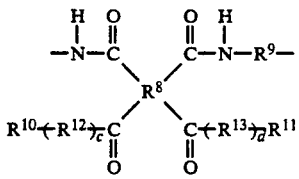
(V)

wherein $R^8$ is a tetravalent organic group, each of $R^9$, $R^{12}$ and $R^{13}$ is independently a divalent organic group, each of $R^{10}$ and $R^{11}$ is independently monovalent organic group having a steroidal skeleton or a hydroxyl group (at least one of these is a monovalent organic group having a steroidal skeleton), and c and d are 0 or 1.

The above polymers will be detailed hereinafter.

At first, the specific polymers I and II are described in detail.

In the formula (I) for the compound I, $R^1$ is a tetravalent organic group which is a moiety which remains after the acid anhydride groups are removed from a tetracarboxylic dianhydride.

Examples of the compound I include aliphatic and alicyclic tetracarboxylic anhydrides such as butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro)-2,5-dioxo-3-furanyl)naphtho[1,2-c]-furan-1,3-dione, 5-(2,5-dioxotetrahydrofuranyl)-3-methyl-3-cyclohexene-1,2-dicarboxylic dianhydride and bicyclo[2,2,2-oct-7-ene-2,3,5,6-tetracarboxylic dianhydride; and aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic)phenylphosphine oxide dianhydride, p-phenylene-bis(triphenylphthalic) dianhydride, m-phenylene-bis(triphenylphthalic) dianhydride, bis(triphenylphthalic)-4,4'-diphenyl ether dianhydride and bis(triphenylphthalic)-4,4'-diphenylmethane dianhydride. Preferred among these are butanetetracarboxylic dianhydride, 1,2,3,4-cyclobutanetetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-tetrahydro-2,5-dioxo-3-furanyl)naphtho[1,2-c]furan-1,3-dione. Most preferred is 2,3,5-tricarboxycyclopentylacetic dianhydride.

The compound II has the formula (II). In the formula (II), $R^2$ is a trivalent organic group (when a is 1) or a tetravalent organic group (when a is 2).

The compound II can be obtained by reacting a dinitro compound having a specific reactive group with a compound having a steroidal skeleton and reducing the nitro group.

That is, in the formula (II), $R^2$ refers to a moiety which remains after a nitro group and a functional group that reacts with the functional group of $R^3$ are removed from a specific dinitro compound which will be described later.

$R^3$ is a divalent organic group, and preferably refers to an organic group selected from:
—C(=O)—O—,
—O—C(=O)—,
—NH—C(=O)—,
—C(=O)—NH— and
—O—.

Further, $R^4$ is a monovalent organic group having a steroidal skeleton. This organic group will be apparent from steroidal compounds to be described later.

The examples and production process of the compound II will be described hereinafter concerning each of the above preferred divalent organic groups of $R^3$.

The compound II of the formula (II) in which $R^3$ is —C(=O)—O— is obtained by reacting a dinitro compound having an acid chloride group with a steroidal compound having a hydroxyl group in a solvent in the presence of a basic catalyst, and reducing the reaction product to convert the nitro group into an amino group.

Examples of the dinitro compound having an acid chloride group include 2,4-dinitrobenzoyl chloride, 2,6-dinitrobenzoyl chloride, 3,4-dinitrobenzoyl chloride, 3,5-dinitrobenzoyl chloride, 5,5'-methylenebis(2-nitrobenzoyl chloride), , 4,4'-dinitrodiphenylether-3,3'-dicarbonyl dichloride and 4,4'-dinitrobiphenyl-3,3'-dicarbonyl chloride. Preferred among these are 2,4-dinitrobenzoyl chloride and 3,5-dinitrobenzoyl chloride.

Examples of the steroidal compound having a hydroxyl group include androsterone, β-cholesterol, cholesterol, corticosterone acetate, dehydroepiandrosterone, epiandrosterone, ergosterol estrone, 11α-hydroxymethyltestosterone, 11α-hydroxyprogesterone, lanosterol, mestranol, methyltestosterone, $\Delta^{9(11)}$-methyltestosterone, norethisterone, pregsterone, β-sitosterol, stigmasterol and testosterone. Among these, preferred are cholesterol and β-cholesterol.

The solvent used for the reaction of the above dinitro compound having an acid chloride group with the above steroidal compound having a hydroxyl group is selected, for example, from tetrahydrofuran, acetone, toluene, and ethers such as diethyl ether, methyl ethyl ether and methyl butyl ether. The basic catalyst is selected from pyridine and triethylamine.

The reducing agent for the above reduction of the reaction product is advantageously selected, for example, from zinc, iron, tin, tin chloride (II), sodium sulfides ($Na_2S$, $Na_2S_2$ and $Na_2S_x$), sodium hydrosulfide, sodium dithionite and ammonium sulfide. The reduction may also be carried out with a hydrogen gas, hydrazine, hydrochloric acid, or the like in the presence of a catalyst selected from palladium-carbon, platinum, Raney nickel, platinum black, rhodium-alumina and carbon platinum sulfide.

The solvent for the above reduction is selected, for example, from alcohols such as ethanol, methanol and 2-propanol, ethers such as diethyl ether, methyl ethyl ether and methyl butyl ether, ammonia water, toluene, water, tetrahydrofuran, chloroform and dichloromethane.

The compound II of the formula (II) in which $R^3$ is a —O—C(=O)— is obtained by reacting a dinitro compound having a hydroxyl group with a steroidal compound having a acid chloride group in a solvent in the presence of a basic catalyst, and then reducing the reaction product to convert the nitro group into an amino group.

Examples of the dinitro compound having a hydroxyl group include 4,6-dinitro-o-cresol, 3,5-dinitro-o-cresol, 2,4-dinitrophenol, 2,6-dinitrophenol, 2,5-dinitrophenol, 4,4'-methylenebis(2-hydroxynitrobenzene), 3,3'-hydroxy-4,4'-dinitrobiphenyl ether and 3,3'-dihydroxy-4,4'-dinitrobiphenyl. Preferred among these are 2,4-dinitrophenol and 2,5-dinitrophenol.

Examples of the steroidal compound having an acid chloride group include chenodeoxycholic chloride, cholic chloride, deoxycholic chloride dehydrocholic chloride, hyodeoxycholic chloride and ursodeoxychloic chloride. Preferred among these are cholic chloride and dehydrocholic chloride.

The solvent and the basic catalyst used for the above reaction of the dinitro compound having a hydroxyl group with the steroidal compound having an acid chloride group, and the reducing agent used for the reduction of the reaction product are similarly selected as described above.

The compound II of the formula (II) in which $R^3$ is —NH—C(=O)— is obtained by reacting a dinitro compound having an amino group with a steroidal compound having an acid chloride group in a solvent in the presence of a basic catalyst, and then reducing the reaction product to convert the nitro group into an amino group.

Examples of the dinitro compound having an amino group include 6-chloro-2,4-dinitroaniline, 2,4-dinitroaniline, 2,6-dinitroaniline. 5,5'-methylenebis(2-nitroaniline), 3,3'-diamino-4,4'-dinitrophenyl ether and 3,3'-diamino-4,4'-dinitrobiphenyl. Preferred among these are 6-chloro-2,4-dinitroaniline and 2,4-dinitroaniline.

Examples of the steroidal compound having an acid chloride group are the same as those described above.

The solvent and the basic catalyst used for the above reaction of the dinitro compound having an amino group with the steroidal compound having an acid chloride group, and the reducing agent used for the reduction of the reaction product are similarly selected as described above.

The compound II of the formula (II) in which $R^3$ is —C(=O)—NH— is obtained by reacting a dinitro compound having an acid chloride group with a steroidal compound having an amino group in a solvent in the presence of a basic catalyst, and then reducing the reaction product to convert the nitro group into an amino group.

Examples of the dinitro compound having an acid chloride group are the same as those described above.

Examples of the steroidal compound having an amino group include androsterylamine, β-cholesterylamine, cholesterylamine, dehydroepiandrosterylamine, epiandrosterylamine, ergosterylamine, estrylamine, 11α-aminomethyltestosterone, 11α-aminoprogsterone, lanosterylamine, mestranylamine, methyltestosterylamine, $\Delta^{9(11)}$-methyltestosterylamine, norethisterylamine, pregsterylamine, β-sitosterylamine, and stigmasterylamine. Preferred among these are β-cholesterylamine and cholesterylamine.

The solvent and the basic catalyst used for the above reaction of the dinitro compound having an acid chloride group with the dinitro compound having an amino group, and the reducing agent used for the reduction of the reaction product are similarly selected as described above.

The compound II of the formula (II) in which $R^3$ is —O— is obtained by either reacting a dinitro compound having a hydroxyl group with a steroidal compound having a halogen group in the presence of a basic catalyst or reacting a dinitro compound having a halogen group with a steroidal compound having a hydroxyl group in a solvent in the presence of a suitable catalyst, and then reducing the reaction product to convert the nitro group into an amino group.

Examples of the dinitro compound having a hydroxyl group are the same as those described above.

Examples of the steroidal compound having a halogen group include cholesteryl chloride, cholesteryl bromide, androsteryl chloride, androsteryl bromide, β-cholesteryl chloride, β-cholesteryl bromide, epiandroseteryl chloride, epiandrosteryl bromide, ergosteryl chloride, ergosteryl bromide, estryl chloride, estryl bromide, 11α-hydroxymethylsteryl chloride, 11α-hydroxymethylsteryl bromide, 11α-progesteryl chloride, 11α-progesteryl bromide, lanosteryl chloride, lanosteryl bromide, mestranyl chloride, mestranyl bromide, metyltestosteryl chloride, methyltestosteryl bromide, norethisteryl chloride, norethisteryl bromide, pregnenoryl chloride, pregnenoryl bromide, β-sitosteryl chloride, β-sitosteryl bromide, stigmasteryl chloride, stigmasteryl bromide, testosteryl chloride and testosteryl bromide. Preferred among these are cholesteryl chloride, cholesteryl bromide, β-cholesteryl chloride and β-cholesteryl bromide.

Examples of the dinitro compound having a halogen group include 3,5-dinitrochlorobenzene, 4,6-difluoro-m-dinitrobenzene, p,p'-difluoro-m,m'-dinitrodiphenylsulfide, 2-chloro-3,5-dinitropyridine, 4,4'-methylenebis(2-chlorobenzene), 4,4'-methylenebis(2-bromobenzene), 3,3'-dichloro-4,4'-dinitrodiphenyl ether, 3,3'-dibromo-4,4'-dinitrodiphenyl, 3,3'-dichloro-4,4'-dinitrodiphenyl and 3,3'-dibromo-4,4'-dinitrobiphenyl. Preferred among these are 3,5-dinitrochlorobenzene and 2-chloro-3,5-dinitropyridine.

Examples of the steroidal having a hydroxyl group are the same as those described above.

The solvent used for the reaction of dinitro compound having a hydroxyl group with the steroidal compound having a halogen group is selected, for example, from ethers such as diethyl ether, methyl ethyl ether and methyl butyl ether, alcohols such as methanol, ethanol, 2-propanol, and n-butanol, aromatic hydrocarbons such as toluene, acetone, water, dimethylsulfoxide and dimethylformamide. The basic catalyst is selected, for example, from sodium hydroxide, potassium hydroxide, pyridine, triethylamine, sodium potassium carbonate, barium oxide and potassium hydride.

The solvent used for the reaction of the dinitro compound having a halogen group with the steroidal compound having a hydroxyl group is selected, for example, from ethers such as diethyl ether, and methyl ethyl ether, methyl butyl ether and tetrahydrofuran, aromatic hydrocarbons such as toluene, acetone, water, dimethylsulfoxide and dimethylformamide. The catalyst for the above reaction is selected from copper iodide (I) and powdered copper.

The reducing agent is similarly selected at described above.

The specific polymer I used in the invention is obtained by reacting the compound I with the compound II. This reaction is carried out in an organic solvent at a reaction temperature, usually, in the range of 0° to 150° C., preferably in the range of 0° to 100° C.

When the specific polymer I is produced, other diamine (compound III) may be used in combination with the compound II to such an extent that the effect of the present invention is not impaired.

Examples of the compound III include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 4,4'-diaminidiphenyl ether, 1,5-diaminonaphthalene, 3,3'-dimethyl-4,4'-diaminobiphenyl, 4,4'-diaminobenzanilide, 3,4'-diaminodiphenyl ether, 3,3'-diamininobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl and 3,3'-dimethoxy-4,4'-diaminobiphenyl; aromatic diamine having a hetero atom such as diaminotetraphenylthiophene, aliphatic or alicyclic diamines such as m-xylylenediamine, 1,2-ethylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine and tricyclo[6,2,1,0^2.7]-undecylenedimethylenediamine; and a diaminoorganosiloxane of the formula.

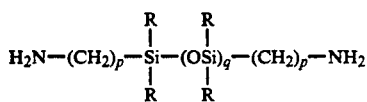

wherein R is a hydrocarbon group having 1 to 12 carbon atoms, i.e., an alkyl group such as methyl, ethyl or propyl, a cycloalkyl group such as cyclohexyl or an aryl group such as phenyl, p is an integer of 1 to 3, and q is an integer of 1 to 20. Preferred among these are p-phenylenediamine, 4,4'-diaminodiphenylmethane, 4,4'-diaminodiphenyl ether, 2,2-bis[4-(4-aminophenoxy)phenyl]propane, 9,9-bis(4-aminophenyl)fluorene, 2,2-bis[4-(4-aminophenoxy)phenyl]hexanfluoropropane and 2,2-bis(4-aminophenyl)hexafluoropropane. These compounds may be used alone or in combination of two or more.

The amount of the compound II for use, based on the total amount of the diamine compounds, is usually 0 to 99.99 mol %, preferably 80 to 99.9mol % for the production of TN and SBE alignment cells and preferably 0 to 80 mol % for the production of an SH alignment cell.

The amount ratio of the compound I and the diamine compound(s) are as follows. The amount of the compound I is set such that the amount of the acid anhydride group of the compound I per equivalent weight of the total diamine compounds is preferably 0.2 to 2 equivalent weights, more preferably 0.3 to 1.2 equivalent weights.

The organic solvent used for the reaction is not specially limited if it can dissolve the specific polymer I formed by the reaction. Examples of the organic solvent include aprotic polar solvents such as N-methyl-2-pyrrolidone, N,N-dimethylacetamide, N,N-dimethylformamide, dimethylsulfoxide, τ-butyrolactone, tetramethylurea and hexamethylphosphortriamide; and phenolic solvents such as m-cresol, xylenol, phenol and halogenated phenol. The amount of the organic solvent is preferably set such that the total amount of the compound I and the diamine compound(s) is 0.1 to 30% by weight based on the total amount of the reaction solution.

The specific polymer II used in the present invention is obtained by imidizing the above specific polymer I under heat or in the presence of a dehydrating agent and an imidization catalyst. The temperature for the above imidization under heat is usually in the range of 60° to 200° C., preferably in the range of 100° to 170° C. When the temperature is lower than 60° C., the reaction proceeds slowly. When it exceeds 60° C., the reaction proceeds slowly. When it exceeds 200° C., the molecular weight of the specific polymer II is liable to decrease greatly. The imidization in the presence of a dehydrating agent and an imidization catalyst can be carried out in the above organic solvent. The reaction temperature is usually in the range of 0° to 180° C., preferably in the range of 60° to 150° C. The dehydrating agent is selected from acid anhydrides such as acetic anhydride, propionic anhydride and trifluoroacetic anhydride. The imidization catalyst is selected, for example, from tertiary amines such as pyridine, collidine, lutidine and triethylamine, although the catalyst is not limited thereto. The amount of the dehydrating agent is preferably 1.6 to 20 mol per mole of the recurring unit of the specific polymer I, and the amount of the imidization catalyst is preferably 0.5 to 10 mols per mole of the dehydrating agent used.

The above organic solvent, when used, may contain a poor solvent such as an alcohol, a ketone, an ester, an ether, a halogenated hydrocarbon and hydrocarbon to such an extent that the polymer formed is not precipitated. The poor solvent is selected, for example, from methyl alcohol, ethyl alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol-n-propyl ether, ethylene glycol-isopropyl ether, ethylene glycol-n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene and xylene.

The thus-obtained specific polymer I or II usually has an inherent viscosity in the rang of 0.05 to 10 dl/g, preferably 0.05 to 5 dl/g when measured under the conditions [$\eta_{inh}$=(ln $\eta_{rel}$)/C, C=0.5 g/dl, 30° C., in N-methyl-2-pyrrolidone), the inherent viscosity values which will follow were all obtained under these conditions].

Secondly, the specific polymers III and IV will be described hereinafter.

Examples of the compound I are the same as those described concerning the above specific polymers I and II.

Examples of the compound III are the same as those described concerning the above specific polymers I and II.

The compound IV is obtained by reacting a nitro compound having a specific reactive group with a compound having a steroidal skeleton, and then reducing the nitro group.

That is, in the formula (IV), $R^6$ is a divalent organic group, and preferably refers to an organic group selected from:
—C(=O)—O—,
—O—C(=O)—,
—NH—C(=O)—,
—C(=O)—NH— and
—O—.

Further, $R^7$ is a monovalent organic group having a steroidal skeleton, and b is 0 or 1.

The example and production process of the compound IV will be described hereinafter concerning each of the above preferred divalent organic groups of $R^6$.

Examples of the compound IV of the formula (IV) in which b is 0 (steroidal compound having an amino group) are the same as those steroidal compounds described so far.

The compound IV of the formula (IV) in which $R^6$ is —C(=O)—O— is obtained by reacting a nitro compound having an acid chloride group with a steroidal compound having a hydroxyl group in a solvent in the presence of a basic catalyst, and then reducing the reaction product to convert the nitro group into an amino group.

Examples of the nitro compound having an acid chloride group include o-nitrobenzoyl chloride, m-nitrobenzoyl chloride and p-nitrobenzoyl chloride. Preferred among these is p-nitrobenzoyl chloride.

Examples of the steroidal compound having a hydroxyl group are the same as those steroidal compounds described so far.

The solvent and the basic catalyst used for the reaction of the nitro compound having an acid chloride group with the steroidal compound having a hydroxyl group, and the reducing agent for reducing the reaction product are similarly selected from those described concerning the above similar reactions.

The compound IV of the formula (IV) in which $R^6$ is —O—C(=O)— is obtained by reacting a nitro compound having a hydroxyl group with a steroidal compound having an acid chloride group in a solvent in the presence of a basic catalyst, and then reducing the reaction product to convert the nitro group into an amino group.

Examples of the nitro compound having a hydroxyl group include o-nitrophenol, m-nitrophenol and p-nitrophenol. Preferred among these is p-nitrophenol.

Examples of the steroidal compound having an acid chloride group are the same as those steroidal compound described so far.

The solvent and the basic catalyst used for the reaction of the nitro compound having a hydroxyl group with the steroidal compound having an acid chloride group, and the reducing agent for reducing the reaction product are similarly selected from those described concerning the above similar reactions.

The compound IV of the formula (IV) in which $R^6$ is —NH—C(=O)— is obtained by reacting a nitro compound having an amino group with a steroidal compound having an acid chloride group in a solvent in the presence of a basic catalyst, and then reducing the reaction product to convert the nitro group into an amino group.

Examples of the nitro compound having an amino group include o-nitroaniline, m-nitroaniline and p-nitroaniline. Preferred among these is p-nitroaniline.

Examples of the steroidal compound having an acid chloride group are the same steroidal compounds described so far.

The solvent and the basic catalyst used for the reaction of the nitro compound having an amino group with the steroidal compound having an acid chloride group, and the reducing agent for reducing the reaction product are similarly selected from those described concerning the above similar reactions.

The compound IV of the formula (IV) in which $R^6$ is —C(=O)—NH— is obtained by reacting a nitro compound having an acid chloride group with a steroidal compound having an amino group in a solvent in the presence of a basic catalyst, and then reducing the reaction product to convert the nitro group into an amino group.

Examples of the nitro compound having an acid chloride group are the same as those nitro compounds described so far.

Examples of the steroidal compound having an amino group are the same as those steroidal compounds described so far.

The solvent and the basic catalyst used for the reaction of the nitro compound having an acid chloride group with the steroidal compound having an amino group, and the reducing agent for reducing the reaction product are similarly selected from those described concerning the above similar reactions.

The compound IV of the formula (IV) in which $R^6$ is —O— is obtained by either reacting a nitro compound having a hydroxyl group with a steroidal compound having a halogen group in a solvent in the presence of a basic catalyst or reacting a nitro compound having a halogen group with a steroidal compound having a hydroxyl group in a solvent in the presence of a basic catalyst, and then reducing the reaction product to convert the nitro group into an amino group.

Examples of the nitro compound having a hydroxyl group are the same as those nitro compounds described so far.

Examples of the steroidal compound having a halogen group are also the same as those steroidal described so far.

Examples of the nitro compound having a halogen group include o-nitrochlorobenzene, m-nitrochlorobenzene, p-nitrochlorobenzene, o-nitrobromobenzene, m-nitrobromobenzene, p-nitrobromobenzene, o-nitrofluorobenzene, m-nitrofluorobenzen and p-nitrofluorobenzene. Preferred among these are p-nitrochlorobenzene, p-nitrobromobenzene and p-nitrofluorobenzene.

Examples of the steroidal compound having a hydroxyl group are the same as those steroidal compounds described so far.

The solvent and the basic catalyst used for the reaction of the nitro compound having a hydroxyl group with the steroidal compound having a halogen group, and the reducing agent for reducing the reaction product are similarly selected from those described concerning the above similar reactions.

The solvent and the basic catalyst used for the reaction of the nitro compound having a halogen group with the steroidal compound having a hydroxyl group, and the reducing agent for reducing the reaction product are similarly selected from those described concerning the above similar reactions.

The specific polymer II used in the invention is obtained by reacting the compound I, the compound III and the compound IV.

The above reaction is carried out in an organic solvent at a temperature usually in the range of 0° to 150° C., preferably in the range of 0° to 100° C.

The amount ratio of the above three compounds as starting materials preferably satisfies the following two expressions.

(1) Molar amount of compound I > molar amount of compound III ≧ molar amount of compound IV × ½
(2) 2 × (molar amount of compound I − molar amount of compound III) ≧ molar amount of compound IV The molar amounts of the compounds I, III and IV are varied within such a range that the above two expressions are satisfied, whereby there can be obtained a specific polymer III which can give any pretilt angle.

The organic solvent used for the above reaction is selected from those described concerning the reaction for the specific polymer I.

The amount of the organic solvent for use is preferably set such that the total amount of the compounds I, III and IV is 0.1 to 30% by weight based on the total reaction solution.

The specific polymer IV is obtained by imidizing the above specific polymer II under heat or in the presence of a dehydrating agent and an imidization catalyst. The imidization temperature is the same as that described concerning the imidization of the specific polymer I. Further, the dehydration agent and the imidization catalyst are also the same as those described concerning the imidization of the specific polymer I.

The thus-obtained specific polymer III or IV usually has an inherent viscosity in the range of 0.05 to 10 dl/g, preferably 0.05 to 5 dl/g when measured under the conditions [$\eta_{inh} = (\ln \eta_{rel})/C$, C=0.5 g/dl, 30° C., in N-methyl-2-pyrrolidone)].

Thirdly, the specific polymer V will be described hereinafter.

In the formula (V), $R^8$ is a tetravalent organic group, and is the same as $R^1$ in the formula (I).

In the formula (V), $R^9$ is a divalent organic group, and is the same as $R^5$ in the formula (III).

In the formula (V), each of $R^{10}$ and $R^{11}$ is independently a monovalent organic group having a steroidal skeleton or a hydroxyl group (at least one of these is a monovalent organic group having a steroidal skeleton).

In the formula (V), each of $R^{12}$ and $R^{13}$ is a divalent organic group, and is selected, for example, from —O— and —NH—.

In the formula (V), c and d are 0 or 1.

The specific polymer V of the formula (V) in which each of $R^{12}$ and $R^{13}$ is —O— is obtained, for example, by reacting a polyamic acid with a steroidal compound having a hydroxyl group in a solvent in the presence of a catalyst.

The above catalyst is selected, for example, from sulfuric acid, hydrochloric acid, p-toluenesulfonic acid and methanesulfonic acid.

The above solvent is selected from those described concerning the synthesis of the specific polymer I.

The polyamic acid is obtained by reacting a tetracarboxylic dianhydride with a diamine in a solvent at a temperature in the range of 0° to 100° C.

The above tetracarboxylic dianhydride is preferably selected from those examples of the compound I. The above diamine is also preferably selected from those examples of the compounds II and III.

Examples of the steroidal compound having a hydroxyl group are the same as those steroidal compounds described so far.

The specific polymer V of the formula (V) in which each of $R^{12}$ and $R^{13}$ is —NH— is obtained, for example, by reacting a polyamic acid chloride with a steroidal compound having an amino group in a solvent in the presence of a catalyst.

The polyamic acid chloride is obtained by adding 2 to 10 mol, preferably 3 to 6 mol, per mole of the polyamic acid, of thionyl chloride to a polyamic solution.

The catalyst used for the reaction of the polyamic acid chloride with the steroidal compound having an amino group is selected, for example, from nitrogen-containing compounds such as pyridine, triethylamine, quinoline, collidine, piperazine and piperidine.

The above solvent is selected from those solvents described concerning the synthesis of the specific polymer I.

The thus-obtained specific polymer V usually has an inherent viscosity of 0.05 to 10 dl/g, preferably 0.05 to 5 dl/g.

The liquid crystal aligning agent of the present invention contains preferably any one of the above specific polymers I to V.

The present inventors have made it clear for the first time that polyamic acids having a steroidal skeleton and polymers obtained by imidization thereof such as the above specific polymers I to V can be advantageously used as a liquid crystal aligning agent.

According to the present invention, therefore, there is provided a use of a polymer selected from the group consisting of a polyamic acid having a steroidal skeleton and an imidized product thereof as a liquid crystal aligning agent.

When the liquid crystal aligning agent of the present invention is applied to a substrate, a monoamine may be incorporated in order to adjust the molecular weight of the above polymer and optimizer the coatability thereof on the substrate.

The above monoamine is selected, for example, from aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine and n-eicosylamine.

The liquid crystal aligning agent of the present invention may contain a functional silane-containing compound to improve the adhesion of the above polymer having a steroidal skeleton such as the above specific polymers I to V to a substrate.

The functional silane-containing compound is preferably selected, for example, from 3-aminopropyltrimethoxysilane, 3-aminopropyltriethoxysilane, 2-aminoproyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetrimaine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane and N-bis(oxyethylene)-3-aminopropyltriethoxysilane.

The liquid crystal aligning agent of the present invention is advantageously used to form a liquid crystal-aligning film, for example, for a TN display device, an SBE display device and an SH display device.

The liquid crystal display device of the present invention is produced, for example by the following method using the liquid crystal aligning agent of the present invention.

The liquid crystal aligning agent of the present invention is applied to the transparent electrically conductive film side of a substrate by any one of a roll coating method, a spinner method and a printing method, and heated at a temperature in the range of 80° to 200° C., preferably 120° to 200° C. to form a coating. The thickness of the coating is usually 0.001 to 1 μm, preferably 0.005 to 0.5 μm.

The above-formed coating is subjected to a rubbing treatment with a roll wrapped with a cloth of a synthetic fiber such as nylon to form a liquid crystal aligning film.

The above substrate is selected from transparent substrates formed of glass such as float glass and soda glass, and plastic films of polyethylene terephthalate, polybutylene terephthalate, polyethersulfone, polycarbonate, etc.

The above transparent electrically conductive film is selected from an NESA film composed of $SnO_2$ and an ITO film composed of $In_2O_3$—$SnO_2$. The patterning of this transparent electrically conductive film is carried out by a photo-etching method or a method preliminarily using a mask.

Before the application of the liquid crystal aligning agent, a functional silane-containing compound or titanate may be preliminarily applied onto the substrate and the transparent electrically conductive film to further improve the adhesion of the substrate and the transparent electrically conductive film to the coating.

Two substrates on each of which the liquid crystal aligning film is formed are positioned such that the liquid crystal aligning films face each other with their rubbing directions at right angles or in antiparallel, the marginal areas of the substrates are sealed with a sealing agent, a liquid crystal is filled, and the filling hole is sealed to form a liquid crystal cell. Polarizers are attached to the cell in such a manner that the polarization direction of each is in agreement, or at right angles, with the rubbing direction of each liquid crystal aligning film. Thus, the liquid crystal display device is produced.

As the above sealing agent, there may be used an epoxy resin containing a curing agent and aluminum oxide particles as a spacer.

As the above liquid crystal, nematic liquid crystals and smectic liquid crystals are used. Of these, nematic liquid crystals are preferred. The liquid crystal is selected from Schiff's base liquid crystal, azoxy liquid crystal, biphenyl liquid crystal, phenylcyclohexane liquid crystal, ester liquid crystal, terphenyl liquid crystal, biphenylcyclohexane liquid crystal, pyrimidine liquid crystal, dioxane liquid crystal, bicyclooctane liquid crystal and cubane liquid crystal. Further, the liquid crystal may contain cholesteric liquid crystal such as cholesteryl chloride, cholesteryl nonate and cholesteryl carbonate and such a commercially available chiral agent as C-15 and CB-15 (trade name, supplied by Merck Ltd.). Further, a ferroelectric liquid crystal such as p-disiloxybenzylidene-p-amino-2-methylbutyl cinnamate may be used.

The polarizer attached to the outside of the liquid crystal cell is selected from a polarizer obtained by stretching to orient a polyvinyl alcohol with allowing it to absorb iodine to form a polarization film that is called as an H film and then sandwiching the polarization film between cellulose acetate protection films and a polarizer formed of the H film only.

As described above, the present invention provides a liquid crystal display device having a liquid crystal aligning film formed from the liquid crystal aligning agent of the present invention, such as an SBE display device or an SH display device.

The present invention will be explained further in detail by reference to Examples. However, the present invention shall not be limited to these Examples.

In addition, the tilt angles described in Examples were measured by a crystal rotation method using an He-Ne laser light according to the method described in T. J. Scheffer, et al., J. Appl. Phys., 19, 2013 (1980).

Liquid crystal cells were evaluated on their alignability as follows; While a voltage was turned on and off, the liquid crystal cells were observed under a polarization microscope to see whether or not an abnormal domain was present. When no abnormal domain was present, such cells were taken as being good.

SYNTHESIS EXAMPLE 1

9.20 Grams of 3,5-dinitrobenzoyl chloride and 15.42 g of cholesterol were dissolved in 100 g of toluene. Then, 15.42 g of pyridine was gradually added dropwise, and the mixture was allowed to react at 25° C. for 10 hours.

The above-obtained reaction solution was washed with a sodium hydrogencarbonate aqueous solution three times, and then the solvent was removed. The residue was recrystallized from ethanol to give a white crystal of a dinitrocompound (yield 84.4%).

SYNTHESIS EXAMPLE 2

8.59 Grams of the dinitro compound obtained in Synthesis Example 1 was dissolved in 100 g of ethanol, and after 0.1 g of Pd/C and 5 g of hydrazine monohydrate were added, the mixture was refluxed for 6 hours. The reaction mixture was cooled to room temperature, and the precipitate was recovered by filtration and recrystallized from ethanol to give a compound IIa having a steroidal skeleton (yield 52.4%).

SYNTHESIS EXAMPLE 3

40.8 Grams of 2,3,5-tricarboxycyclopentylacetic dianhydride, 18.99 g of p-phenylenediamine and 0.92 g of the compound IIa were dissolved in 540 g of N-methyl-2-pyrrolidone, and the mixture was allowed to react at room temperature for 6 hours.

Then, the reaction mixture was poured into a large excess of methanol to precipitate the reaction product. Then, the reaction product was washed with methanol and dried under reduced pressure for 15 hours to give 41.32 g of a specific polymer Ia having an inherent viscosity of 0.94 dl/g.

SYNTHESIS EXAMPLE 4

30.0 Grams of the specific polymer Ia obtained in Synthesis Example 3 was dissolved in 570 g of $\gamma$-butyrolactone, and after 36.69 g of pyridine and 31.25 g of acetic anhydride were added, the mixture was subjected to an imidization reaction at 120° C. for 3 hours.

The above-obtained reaction product solution was subjected to precipitation in the same manner as in Synthesis Example 1 to give 31.4 g of a specific polymer IIa having an inherent viscosity of 0.94 dl/g.

SYNTHESIS EXAMPLE 5

Synthesis Example 3 was repeated except that the amount of acid anhydride was changed to 39.61 g, that the amount of p-phenylenediamine was changed to 18.58 g and that the amount of the compound IIa was changed to 1.83 g to give a specific polymer Ib. Further, the imidization reaction using this specific polymer Ib was carried out in the same manner as in Synthesis Example 4 to give 46.30 g of a specific polymer IIb having an inherent viscosity of 0.92 dl/g.

SYNTHESIS EXAMPLE 6

Synthesis Example 3 was repeated except that the amount of acid anhydride was changed to 39.61 g, that the amount of p-phenylenediamine was changed to 18.58 g and that the amount of the compound IIa was changed to 9.2 g to give a specific polymer Ic. Further, the imidization reaction using this specific polymer Ic was carried out in the same manner as in Synthesis Example 4 to give 46.30 g of a specific polymer IIc having an inherent viscosity of 0.92 dl/g.

SYNTHESIS EXAMPLE 7

Synthesis Example 1 was repeated except that the steroidal compound was replaced with 15.5 g of $\beta$-cholesterol to give 17.3 g of a compound IIb.

SYNTHESIS EXAMPLE 8

Synthesis Example 2 was repeated except that the dinitro compound was replaced with 7.0 g of the compound IIb obtained in Synthesis Example 7 to give 4.0 g of a compound IIb having a steroidal skeleton (yield 40.1%).

SYNTHESIS EXAMPLE 9

Synthesis Example 3 was repeated except that the amount of acid anhydride was changed to 39.61 g, that the amount of p-phenylenediamine was changed to 18.91 g and that 0.92 g of the compound IIa was replaced with 0.98 g of the compound IIb to give a specific polymer Id. Further, the imidization reaction using this specific polymer Id was carried out in the same manner as in Synthesis Example 4 to give 46.30 g of a specific polymer IId having an inherent viscosity of 0.92 dl/g.

SYNTHESIS EXAMPLE 10

18.31 Grams of 2,4-dinitroaniline and 40.86 g of cholic chloride were dissolved in 200 g of toluene. Then, 7.9 g of pyridine was gradually added dropwise, and the mixture was allowed to react at 25° C. for 10 hours.

The above-obtained reaction solution was washed with sodium hydrogencarbonate aqueous solution three times, and the solvent was removed. The residue was recrystallized from ethanol to give a pale yellow dinitro compound (yield 75.3%).

SYNTHESIS EXAMPLE 11

9.2 Grams of the dinitro compound obtained in Synthesis Example 10 was dissolved in 100 g of ethanol, and after 0.1 g of Pd/C and 5 g of hydrazine monohydrate were added, the mixture was refluxed for 8 hours. The reaction mixture was cooled to room temperature, and then the precipitate was recovered by filtration and recrystallized from ethanol to give a compound IIc having a steroidal skeleton (yield 50.4%).

SYNTHESIS EXAMPLE 12

Synthesis Example 3 was repeated except that the amount of acid anhydride was changed to 20.3 g, that the amount of p-phenylenediamine was changed to 9.69 g and that 0.92 g of the compound IIa was replaced with 0.45 g of the compound IIc to give a specific polymer Ie. Further, the imidization reaction using this specific polymer Ie was carried out in the same manner as in Synthesis Example 4 to give 25.0 g of a specific polymer IIe having an inherent viscosity of 0.92 dl/g.

SYNTHESIS EXAMPLE 13

Synthesis Example 3 was repeated except that the amount of acid anhydride was changed to 20.3 g, that the amount of p-phenylenediamine was changed to 9.69 g and that 0.92 g of the compound IIa was replaced with 0.9 g of the compound IIc to give a specific polymer If. Further, the imidization reaction using this specific polymer Ie was carried out in the same manner as in Synthesis Example 4 to give 34.31 g of a specific polymer IIf having an inherent viscosity of 0.92 dl/g.

SYNTHESIS EXAMPLE 14

Synthesis Example 3 was repeated except that the amount of acid anhydride was changed to 20.3 g, that the amount of p-phenylenediamine was changed to 8.81 g and that 0.92 g of the compound IIa was replaced with 0.45 g of the compound IIc to give a specific polymer Ig. Further, the imidization reaction using this specific polymer Ig was carried out in the same manner as in Synthesis Example 4 to give 27.0 g of a specific polymer IIg having an inherent viscosity of 0.92 dl/g.

SYNTHESIS EXAMPLE 15

18.41 Grams of 2,5-dinitrophenol, 40.51 g of cholesteryl chloride and 5.6 g of potassium hydroxide were dissolved in 400 g of ethanol. The mixture was refluxed for 6 hours, and the precipitate was recovered by filtration and recrystallized from ethanol to give 38.7 of a dinitro compound.

SYNTHESIS EXAMPLE 16

5.52 Grams of the dinitro compound obtained in Synthesis Example 15 was dissolved in 100 g of ethanol, and after 0.1 g of Pd/C and 5 g of hydrazine monohydrate were added, the mixture was refluxed for 12 hours. The reaction mixture was cooled to room temperature, and then precipitate was recovered by filtration and recrystallized from ethanol to give 3.94 g of a compound IId having a steroidal skeleton.

SYNTHESIS EXAMPLE 17

Synthesis Example 3 was repeated except that the amount of acid anhydride was changed to 20.0 g, that the amount of p-phenylenediamine was changed to 9.55 g and that 0.92 g of the compound IIa was replaced with 0.44 g of the compound IId to give a specific polymer Ih. Further, the imidization reaction using this specific polymer Ih was carried out in the same manner as in Synthesis Example 4 to give 35.55 g of a specific polymer IIh having an inherent viscosity of 0.92 dl/g.

SYNTHESIS EXAMPLE 18

Synthesis Example 3 was repeated except that the amount of acid anhydride was changed to 20.0 g, that the amount of p-phenylenediamine was changed to 9.11 g and that 0.92 g of the compound IIa was replaced with 0.88 g of the compound IId to give a specific polymer Ii. Further, the imidization reaction using this specific polymer Ii was carried out in the same manner as in Synthesis Example 4 to give 35.12 g of a specific polymer IIi having an inherent viscosity of 0.92 dl/g.

SYNTHESIS EXAMPLE 19

Synthesis Example 3 was repeated except that the amount of acid anhydride was changed to 20.0 g, that the amount of p-phenylenediamine was changed to 8.68 g and that 0.92 g of the compound IIa was replaced with 4.4 g of the compound IIc to give a specific polymer Ij. Further, the imidization reaction using this specific polymer Ij was carried out in the same manner as in Synthesis Example 4 to give 33.1 g of a specific polymer IIj having an inherent viscosity of 0.92 dl/g.

SYNTHESIS EXAMPLE 20

Synthesis Example 3 was repeated except that the amount of acid anhydride was changed to 20.0 g, that the amount of p-phenylenediamine was changed to 9.65 g to give a specific polymer Ik. Further, the imidization reaction using this specific polymer Ik was carried out in the same manner as in Synthesis Example 4 to give 27.44 g of a specific polymer IIk having an inherent viscosity of 1.40 dl/g.

SYNTHESIS EXAMPLE 21

Synthesis Example 3 was repeated except that the amount of acid anhydride was changed to 44.83 g, that the diamine was replaced with 16.22 g of p-phenylenediamine and 16.04 g of 2,2-bis(4-aminophenyl)hexafluoropropane and that the amount of the compound IIa was changed to 1.04 g to give a specific polymer Il. Further, the imidization reaction using this specific polymer Il was carried out in the same manner as in Synthesis Example 4 to give 68.32 g of a specific polymer IIl having an inherent viscosity of 0.98 dl/g.

SYNTHESIS EXAMPLE 22

Example 21 was repeated except that the amount of p-phenylenediamine was changed to 10.81 g and that the amount of 2,2-bis(4-aminophenyl)hexafluoropropane was changed to 33.09 g to give a specific polymer Im. Further, the imidization reaction using this specific polymer Im was carried out in the same manner as in Synthesis Example 4 to give 69.43 g of a specific polymer IIm having an inherent viscosity of 0.96 dl/g.

SYNTHESIS EXAMPLE 23

Synthesis Example 21 was repeated except that the p-phenylenediamine was replaced with 29.74 g of 4,4'-diaminodiphenylmethane to give a specific polymer In. Further, the imidization reaction using this specific polymer In was carried out in the same manner as in Synthesis Example 4 to give a 70.02 g of a specific polymer IIn having an inherent viscosity of 0.89 dl/g.

SYNTHESIS EXAMPLE 24

Synthesis Example 23 was repeated except that the amount of 4,4'-diaminodiphenylmethane was changed to 19.83 g and that the amount of 2,2-bis(4-aminophenyl)hexafluoropropane was changed to 33.09 g to give a specific polymer Io. Further, the imidization reaction using this specific polymer Io was carried out in the same manner as in Synthesis Example 4 to give 68.43 g of a specific polymer IIo having an inherent viscosity of 0.86 dl/g.

SYNTHESIS EXAMPLE 25

9.28 Grams of p-nitrobenzoyl chloride and 19.33 g of cholesterol were dissolved in 100 g of toluene. Then, 20 g of pyridine was gradually added, and the mixture was allowed to react at 25° C. for 10 hours.

Then, the reaction solution was washed with pure water three times, and the solvent was removed. Then, the reaction product was recrystallized from ethanol to give a white crystal of a nitro compound (yield 86.1%).

SYNTHESIS EXAMPLE 26

10 Grams of the nitro compound obtained in Synthesis Example 25 was dissolved in 100 g of ethanol, and after 0.1 g of Pd/C and 5 g of hydrazine monohydrate were added, the mixture was refluxed for 6 hours. The reaction mixture was cooled to room temperature, and then precipitate was recovered by filtration and recrystallized from ethanol to give a compound IVa having a steroidal skeleton (yield 55.1%).

SYNTHESIS EXAMPLE 27

44.83 Grams of 2,3,5-tricarboxycyclopentylacetic dianhydride, 39.26 g of 4,4'-diaminodiphenylmethane and 2.09 g of the compound IVa were dissolved in 776 g of N-methyl-2-pyrrolidone, and the mixture was allowed to react at room temperature for 6 hours.

Then, the reaction mixture was poured into a large excess of methanol to precipitate a reaction product. The reaction product was washed with methanol and dried under reduced pressure at 40° C. for 15 hours to give 68.92 g of a specific polymer IIIa having an inherent viscosity of 0.71 dl/g.

SYNTHESIS EXAMPLE 28

25 Grams of the specific polymer IIIa obtained in Synthesis Example 27 was dissolved in 475 g of N-methyl-2-pyrrolidone, and after 15.57 g of pyridine and 12.06 g of acetic anhydride were added, the mixture was subjected to an imidization reaction at 120° C. for 3 hours.

Then, the reaction product solution was subjected to precipitation in the same manner as in Synthesis Example 27 to give 21.2 g of a specific polymer IVa having an inherent viscosity of 0.77 dl/g.

SYNTHESIS EXAMPLE 29

Synthesis Example 27 was repeated except that the 4,4'-diaminodiphenylmethane was replaced with 21.63 g of p-phenylenediamine to give a specific polymer IIIb. Further, the imidization reaction using the specific polymer IIIb was carried out in the same manner as in Synthesis Example 28 to give 46.30 g of a specific polymer IVb having an inherent viscosity of 0.81 dl/g.

SYNTHESIS EXAMPLE 30

Synthesis Example 27 was repeated except that the 4,4'-diaminodiphenylmethane was replaced with 10.81 g of p-phenylenediamine and 33.43 g of 2,2-bis(4-aminophenyl)hexafluoropropane to give a specific polymer IIIc. Further, the imidization reaction using the specific polymer IIIc was carried out in the same manner as in Synthesis Example 28 to give 18.9 g of a specific polymer IVc having an inherent viscosity of 0.74 dl/g.

SYNTHESIS EXAMPLE 31

Synthesis Example 27 was repeated except that the steroidal compound was replaced with 19.43 g of β-cholesterol to give 15.15 g of a nitro compound. Then, the reaction was carried out in the same manner as in Synthesis Example 26 to give 5.2 g of a compound IVb.

SYNTHESIS EXAMPLE 32

Synthesis Example 27 was repeated except that the compound IVa was replaced with 2.10 g of the compound IVb to give a specific polymer IIId. Further, the imidization reaction using the specific polymer IIId was carried out in the same manner as in Synthesis Example 28 to give 21.4 g of a specific polymer IVd having an inherent viscosity of 0.68 dl/g.

SYNTHESIS EXAMPLE 33

Synthesis Example 27 was repeated except that the amount of 4,4'-diaminodiphenylmethane was changed to 38.86 g and that the amount of the compound IVa was changed to 4.17 g to give a specific polymer IIIE. Further, the imidization reaction using the specific polymer IIIe was carried out in the same manner as in Synthesis Example 28 to give 19.2 g of a specific polymer IVe having an inherent viscosity of 0.58 dl/g.

SYNTHESIS EXAMPLE 34

Synthesis Example 27 was repeated except that the amount of 4,4'-diaminodiphenylmethane was changed to 38.07 g and that the amount of the compound IVa was changed to 8.35 g to give a specific polymer IIIf. Further, the imidization reaction using the specific polymer IIIf was carried out in the same manner as in Synthesis Example 28 to give 17.1 g of a specific polymer IVf having an inherent viscosity of 0.46 dl/g.

SYNTHESIS EXAMPLE 35

Synthesis Example 27 was repeated except that the amount of 4,4'-diaminodiphenylmethane was changed to 31.72 g and that the amount of the compound IVa was changed to 41.01 g to give a specific polymer IIIg. Further, the imidization reaction using the specific polymer IIIg was carried out in the same manner as in Synthesis Example 28 to give 14.1 g of a specific polymer IVg having an inherent viscosity of 0.26 dl/g.

SYNTHESIS EXAMPLE 36

6.96 Grams of p-nitrophenol and 21.66 g of cholic chloride were dissolved in 100 g of toluene. Then, 20 g of pyridine was gradually added, and the mixture was allowed to react at 25° C. for 10 hours.

The thus-obtained reaction solution was purified in the same manner as in Synthesis Example 25 to give a white crystal of a nitro compound (yield 71.1%).

SYNTHESIS EXAMPLE 37

10 Grams of the nitro compound obtained in Synthesis Example 36 was subjected to the same reaction and purification as those described in Synthesis Example 26 to give a compound IVc (yield 50.6%).

SYNTHESIS EXAMPLE 38

Synthesis Example 27 was repeated except that the compound IVa was replaced with the compound IVc to give a specific polymer IIIh. Further, the imidization reaction using the specific polymer IIIh was carried out in the same manner as in Synthesis Example 28 to give 22.3 g of a specific polymer IVh having an inherent viscosity of 1.21 dl/g.

SYNTHESIS EXAMPLE 39

9.28 Grams of p-nitrobenzoyl chloride and 19.28 g of cholesterylamine were dissolved in 100 g of toluene. Then, 20 g of pyridine was gradually added, and the mixture was allowed to react at 25° C. for 10 hours.

Then, the reaction solution was purified in the same manner as in Synthesis Example 25 to give a white crystal of a nitro compound (yield 90.2%).

SYNTHESIS EXAMPLE 40

10 Grams of the nitro compound obtained in Synthesis Example 39 was subjected to the same reaction and purification as those described in Synthesis Example 26 to give a compound IVd (yield 46.6%).

SYNTHESIS EXAMPLE 41

Synthesis Example 27 was repeated except that the compound IVa was replaced with the compound IVd to give a specific polymer IIIi. Further, the imidization reaction using the specific polymer IIIi was carried out in the same manner as in Synthesis Example 28 to give 23.4 g of a specific polymer IVi having an inherent viscosity of 0.88 dl/g.

SYNTHESIS EXAMPLE 42

6.91 Grams of p-nitroaniline and 21.66 g of cholic chloride were dissolved in 100 g of toluene. Then, 20 g of pyridine was gradually added, and the mixture was allowed to react at 25° C. for 10 hours.

Then, the reaction solution was purified in the same manner as in Synthesis Example 25 to give a white crystal of a nitro compound (yield 89.7%).

SYNTHESIS EXAMPLE 43

10 Grams of the nitro compound obtained in Synthesis Example 42 was subjected to the same reaction and purification as those described in Synthesis Example 26 to give a compound IVe (yield 43.9%).

SYNTHESIS EXAMPLE 44

Synthesis Example 27 was repeated except that the compound IVa was replaced with the compound IVe to give a specific polymer IIIj. Further, the imidization reaction using the specific polymer IIIj was carried out in the same manner as in Synthesis Example 28 to give 21.6 g of a specific polymer IVj having an inherent viscosity of 1.26 dl/g.

SYNTHESIS EXAMPLE 45

6.96 Grams of p-nitrophenol 4 g of potassium hydroxide and 20.26 g of cholesteryl bromide were dissolved in 400 g of ethanol, and the mixture was refluxed for 6 hours. The precipitate was recovered by filtration, and recrystallized from ethanol to give a white crystal of a nitro compound (yield 70.1%).

SYNTHESIS EXAMPLE 46

10 Grams of the nitro compound obtained in Synthesis Example 45 was subjected to the same reaction and purification as those described in Synthesis Example 26 to give a compound IVe (yield 40.5%).

SYNTHESIS EXAMPLE 47

Synthesis Example 27 was repeated except that the compound IVa was replaced with the compund IVf to give a specific polymer IIIk. Further, the imidization reaction using the specific polymer IIIk was carried out in the same manner as in Synthesis Example 28 to give 19.9 g of a specific polymer IVk having an inherent viscosity of 1.09 dl/g.

SYNTHESIS EXAMPLE 48

Synthesis Example 27 was repeated except that the compound IVa was replaced with cholesterylamine to give a specific polymer IIIl. Further, the imidization reaction using the specific polymer IIIl was carried out in the same manner as in Synthesis Example 28 to give 16.7 g of a specific polymer IVl having an inherent viscosity of 0.58 dl/g.

SYNTHESIS EXAMPLE 49

44.83 Grams of 2,3,5-tricarboxycyclopentylacetic dianhydride and 39.65 g of 4,4'-diaminodiphenylmethane were dissolved in 760 g of N-methyl-2-pyrrolidone, and the mixture was allowed to react at room temperature for 6 hours.

Then, the reaction product solution was poured into a large excess of methanol to precipitate the reaction product. Thereafter, the reaction product was washed with methanol and dried under reduced pressure at 40° C. for 15 hours to give 72.16 g of a polymer having an inherent viscosity of 1.32 dl/g.

SYNTHESIS EXAMPLE 50

20 Grams of the polymer obtained in Synthesis Example 49 was dissolved in 380 g of N-methyl-2-pyrrolidone, and after 1.83 g of cholesterol and 0.5 g of sulfuric acid were added, the mixture was allowed to react at 100° C. for 8 hours.

Then, the reaction product solution was poured into a large excess of methanol to precipitate the reaction product. The reaction product was washed with methanol and dried under reduced pressure at 40° C. for 15 hours to give 19.2 g of a specific polymer Va having an inherent viscosity of 0.92 dl/g.

SYNTHESIS EXAMPLE 51

Synthesis Example 50 was repeated except that the amount of cholesterol was changed into 14.64 g to give a 18.7 g of a specific polymer Vb having an inherent viscosity of 0.76 dl/g.

SYNTHESIS EXAMPLE 52

20 Grams of the polymer obtained in Synthesis Example 49 was dissolved in 380 g of N-methyl-2-pyrrolidone, and after 1.82 g of cholesterylamine and 10 g of thionyl chloride were added, the mixture was allowed to react at 80° C. for 8 hours.

Then, the reaction product solution was poured into a large excess of methanol to precipitate the reaction product. Thereafter, the reaction product was washed with methanol and dried under reduced pressure at 40° C. for 15 hours to give 17.6 g of a specific polymer Vc having an inherent viscosity of 0.84 dl/g.

SYNTHESIS EXAMPLE 53

Synthesis Example 52 was repeated except that the amount of cholesterol was changed into 14.56 g to give a 15.9 g of a specific polymer Vd having an inherent viscosity of 0.69 dl/g.

SYNTHESIS EXAMPLE 54

Synthesis Example 3 was repeated except that the amount of 2,3,5-tricarboxycyclopentylacetic dianhydride was changed to 44.83 g, that the amount of p-phenylenedimaine was changed to 21.3 g, that the amount of the compound IIa was changed to 0.52 g and that 0.74 g of n-dodecylamine was used to give a specific polymer Ip. The imidization reaction using the specific polymer Ip was carried out in the same manner as in Synthesis Example 4 to give a 46.30 g of a specific polymer IIp having an inherent viscosity of 0.19 dl/g.

EXAMPLE 1

The polymer Ia obtained in Synthesis Example 3 was dissolved in 72 g of $\tau$-butyrolactone to prepare a solution having a solid content of 4% by weight. This solution was filtered with a filter having a mesh of 1 $\mu$m to obtain a solution of a liquid crystal aligning agent.

The above-obtained solution was applied onto the transparent electrode side of each of two glass substrates having a transparent electrode of an ITO film with a spinner at a spinning rate of 3,000 rpm for 3 minutes, and dried at 180° C. for 1 hour to form a dry film having a thickness of 0.05 $\mu$m.

The above-formed film on each substrate was subjected to a rubbing treatment with a rubbing machine having a roll with a piece of nylon cloth put around it at a roll rotation rate of 500 rpm at a stage movement rate of 1 cm/second.

Then, an epoxy resin adhesive containing aluminum oxide particles having a diameter of 17 $\mu$m was applied onto the marginal areas of each substrate having a rubbing-treated liquid crystal aligning film by screen printing. And, these two substrates were attached to each other under pressure so that the liquid crystal aligning film surfaces faced each other with the directions of the rubbing in antiparallel, and the adhesive was cured.

Then, a nematic liquid crystal (ZLI-1565 or 2293, supplied by Merck) was filled into a space between the substrates through a liquid crystal filling hole, and the hole was sealed with an epoxy adhesive. Polarizers were attached to the both outside surface of the resultant cell such that the polarization direction of each polarizer was in agreement with the direction of rubbing of the corresponding liquid crystal aligning film to give a liquid crystal display device.

The above-obtained liquid crystal display device showed excellent alignability. The thus-obtained liquid crystal display device using a liquid crystal ZLI-1565 and the thus-obtained liquid crystal device using a liquid crystal ZLI-2293 were measured for pretilt angles to show 3.0° and 4.9°.

EXAMPLES 2-23

Liquid crystal display devices were prepared in the same manner as in Example 1 except that the polymer 1a was replaced with specific polymers IIa, IIb, IIc, IId, IIe, IIf, IIg, IIh, IIi, IIj, III, IIm, IIn, IIo, IIp, IIIa, IVa, IVb, IVc, IVd, IVe, IVf, IVg, IVh, IVi, IVj, IVk, IVl, Va, Vb, Vc and Vd obtained in Synthesis Examples 4, 5, 6, 9, 12, 13, 14, 17, 18, 19, 21, 22, 23, 24, 27, 28, 29, 30, 32, 33, 34, 35, 38, 41, 44, 47, 48, 50, 51, 52, 53 and 54. The resultant liquid crystal display devices were measured for alignability and pretilt angles, and Table 1 shows the results.

TABLE 1

| Example | Polymer | Pretilt angle (degree) ZLI-1565 | Pretilt angle (degree) ZLI-2293 | Liquid crystal alignability |
|---|---|---|---|---|
| 2 | IIa | 4.8 | 5.6 | Excellent |
| 3 | IIb | 6.8 | 7.6 | " |
| 4 | IIc | 88 | 89 | " |
| 5 | IId | 4.4 | 5.0 | " |
| 6 | IIe | 3.8 | 4.0 | " |
| 7 | IIf | 6.0 | 6.8 | " |
| 8 | IIg | 88 | 89 | " |
| 9 | IIh | 3.8 | 4.2 | " |
| 10 | IIi | 5.4 | 5.8 | " |
| 11 | IIj | 88 | 89 | " |
| 12 | III | 4.2 | 5.3 | " |
| 13 | IIm | 5.4 | 6.3 | " |
| 14 | IIn | 3.6 | 4.2 | " |
| 15 | IIo | 4.1 | 5.2 | " |
| 16 | IIIa | 4.6 | 5.8 | " |
| 17 | IVa | 7.3 | 8.6 | " |
| 18 | IVb | 8.3 | 8.5 | " |
| 19 | IVc | 8.6 | 8.8 | " |
| 20 | IVd | 6.8 | 7.1 | " |
| 21 | IVe | 17.5 | 20.1 | " |
| 22 | IVf | 43.1 | 52.6 | " |
| 23 | IVg | 88 | 89 | " |
| 24 | IVh | 6.8 | 6.9 | " |
| 25 | IVi | 7.3 | 7.9 | " |
| 26 | IVj | 7.7 | 9.1 | " |
| 27 | IVk | 5.8 | 6.9 | " |
| 28 | IVl | 8.4 | 9.2 | " |
| 29 | Va | 7.3 | 9.1 | " |
| 30 | Vb | 85 | 86 | " |
| 31 | Vc | 6.4 | 6.6 | " |
| 32 | Vd | 84 | 87 | " |
| 33 | IIp | 5.3 | 6.2 | " |

COMPARATIVE EXAMPLE 1

A liquid crystal display device was prepared in the same manner as in Example 1 except that the polymer Ia was replaced with the specific polymer IIk obtained in Synthesis Example 20, and measure for a pretilt angle to show 2.5°.

The liquid crystal aligning agent of the present invention exhibits excellent alignability and gives a pretilt angle of 3° to 90° due to the introduction of a steroidal skeleton. The liquid crystal aligning agent of the present invention is suitable for the production of an SBE display device or an SH display device.

The liquid crystal display device having a liquid crystal aligning film formed from the liquid crystal aligning agent of the present invention can be also suitably used in a twisted nematic display device and a ferroelectric display device.

Further, the liquid crystal display device having a liquid crystal aligning film formed from the liquid crystal aligning agent of the present invention is excellent in alignability and reliability, and can be effectively used as a display device for a wide variety of devices and machines such as a desk-top calculator, a watch, a clock, a digital display device, a word processor, a personal computer, a liquid crystal television set, and the like.

What is claimed is:

1. A polyamic acid liquid crystalline aligning agent which comprises a polymer formed by reacting a tetracarboxylic dianhydride selected from the group consisting of:

butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2,2,2]-oct-7-ene-2,3,5,6-tetracarboxylic dianhydride, pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilane tetracarboxylic dianhydride, 3,3',4,4'-tetraphenyl-silanetetracarboxylic dianhydride 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyl tetracarboxylic dianhydride, bis(phthalic)phenylphosphine oxide dianhydride, p-phenylene-bis(triphenylphthalic) dianhydride, m-phenylene-bis(triphenylphthalic) dianhydride, bis(triphenylphthalic)-4,4'-diphenyl ether dianhydride and bis(triphenylphthalic)-4,4'-diphenylmethane dianhydride, with a diamine compound of formula (II)

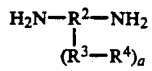

(II)

wherein

R² is a diamine formed by reducing a dinitro compound to a diamine wherein said dinitro compound is selected from the group consisting of: 2,4-dinitrobenzoyl chloride, 2,6-dinitrobenzoyl chloride, 3,4-dinitrobenzoyl chloride, 3,5-dinitrobenzoyl chloride, 5,5'-methylene bis(2-nitrobenzoyl chloride), 4,4'-dinitrodiphenylether-3,3'-dicarbonyl dichloride, 4,4'-dinitrobiphenol-3,3'-dicarbonyl chloride, 4,6-dinitro-o-cresol, 3,5-dinitro-o-cresol, 2,4-dinitrophenol, 2,6-dinitrophenoo, 2,5-dinitrophenol, 4,4'-methylenebis(2-hydroxynitrobenzene), 3,3'-dihydroxy-4,4'-dinitrobiphenyl ether, 3,3'-dihydroxy-4,4'-dinitrobiphenyl, 6-chloro-2,4-dinitroaniline, 2,4-dinitroaniline, 2,6-dinitroaniline, 5,5'-methylenebis(2-nitroaniline), 3,3'-diamino-4,4'-dinitrodiphenyl ether, 3,3'-diamino-4,4'-dinitrobiphenyl, 3,5-dinitrochlorobenzene, 4,6-difluoro-m-dinitrobenzene, p,p'-difluoro-m,m'-dinitrodiphenylsulfide, 2-chloro-3,5-dinitropyridine; 4,4'-methylenebis(2-chlorobenzene), 4,4'-methylenebis(2-bromobenzene), 3,3'-dichloro-4,4'-dinitrodiphenyl ether, 3,3'-dibromo-4,4'-dinitrodiphenyl ether, 3,3'-dichloro-4,4'-dinitrobiphenyl and 3,3'-dibromo-4,4'-dinitrobiphenyl, $R^3$ is a divalent organic group selected from the group consisting of ester, amide and ether;

$R^4$ is steroid selected from the group consisting of: androsterone, β-chloresterol, cholesterol, corticosterone acetate, dehydroepiandrosterone, epiandrosterone, ergosterol estrone, 11α-hydroxymethyltesterone, 11'-hydroxyproesterone, lanosterol, mestranol, methyltestosterone, $\Delta^{9(11)}$-methyltestonsterone, norethisterone, pregsterone, β-sitosterol, stigmasterol, testosterone, chenodeoxycholic chloride, cholic chloride, deoxycholic chloride, dehydrocholic chloride, hydroxycholic chloride, ursodeoxycholic chloride, androsterylamine, β-cholesterylamine, cholesterylamine, dehydroepiandrosterylamine, epiandrosterylamine, ergosterylamine, estrylamine, 11α-aminomethyltestosterone, 11α-aminoprogesterone, lanosterylamine, mestranylamine, methyltestosterlamine, $\Delta^{9(11)}$-methyltestosterylamine, norethisterylamine, pregstrerylamine, β-sitosterylamine, stigmasterylamine, cholesteryl chloride, cholesteryl bromide, androsteryl chloride, androsteryl bromide, β-cholesteryl chloride, β-cholesteryl bromide, epiandroseteryl chloride, epiandrosteryl bromide, ergosteryl chloride, ergosteryl bromide, estryl chloride, estryl bromide, 11α-hydroxymethylsteryl chloride, 11α-hydroxymethylsteryl bromide, 11α-progesteryl chloride, 11α-progesteryl bromide, lanosteryl chloride, lanosteryl bromide, mestranyl chloride, mestranyl bromide, methyltestosteryl chloride, methyltestosteryl bromide, norethisteryl chloride, norethisteryl bromide, pregnenoryl chloride, pregnenoryl bromide, β-sitosteryl chloride, β-sitosteryl bromide, stigmasteryl chloride, stigmasteryl bromide, testosteryl chloride and testosteryl bromide, and a is 1 or 2;

or a mixture of the diamine compound of formula (II) above and a diamine selected from the group consisting of:

p-phenylenediamine, m-phenylenediamine, 4,4'-diaminodiphenylmethane, 4,4'-diamondiphenylethane, 4,4'-diaminodiphenylsulfide, 4,4'-diaminodiphenylsulfone, 4,4'-diaminodiphenyl ether, 1,5-diaminonaphthalene, 3,3'-dimethyl-4,4'-diaminobiphenyl, 4,4'-diaminobenzanilide, 3,4'-diaminodiphenyl ether, 3,3'-diamininobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, diaminotetraphenylthiophene, m-xylylenediamine, 1,2-ethylenediamine, 1,3-propanediamine, tetramethylenediamine, pentamethylenediamine, hexamethylenediamine, heptamethylenediamine, octamethylenediamine, nonmethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2.7}$]-undecyclenedimethyldiamine, and a diamino organosiloxane of the formula:

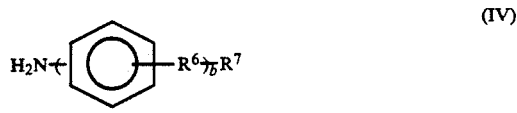

wherein R is a hydrocarbon group having 1 to 12 carbon atoms, cycloalkyl or aryl group, p is an integer of 1 to 3, and q is an integer of 1 to 20.

2. A polyimide derived from repeating units of the polyamic acid in claim 1.

3. An SBE display device or an SH display device having a liquid crystal aligning film formed from the liquid crystal aligning agent in claim 1.

4. A liquid crystal aligning agent comprising a polyamic acid having repeating units derived from the tetracarboxylic dianhydride of claim 1, a diamine of claim 1 and a monoamine formed by reducing a nitro compound, of the formula (IV)

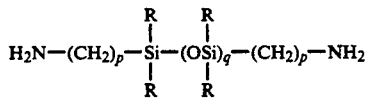

(IV)

wherein $R^6$ is a divalent organic group selected from the group consisting of ester, amide and ether, $R^7$ is a steroid selected from the group consisting of: androsterone, β-cholesterol, cholesterol, corticosterone acetate, dehydroepiandrosterone, epiandrosterone, ergosterol estrone, 11α-hydroxymethyltesterone, 11α-hydroxyprogesterone, lanosterol, mestranol, methyltestosterone, $\Delta^{9(11)}$-methyltestosterone, norethisterone, pregsterone, β-sitosterol, stigmasterol, testosterone, chenodeoxycholic chloride, cholic chloride, deoxycholic chloride dehydrocholic chloride, hydeoxycholic chloride, ursodeoxycholic chloride, androsterylamine, β-cholesterylamine, cholesterylamine, dehydroepiandrosterylamine, epiandrosterylamine, ergosterylamine, estrylamine, aminomethyltestosterone, 11α-aminoprogesterone, lanosterylamine, mestranylamine, methyltestosterylamine, $\Delta^{9(11)}$-methyltestosterylamine, norethisterylamine, pregsterylamine, β-sitosterylamine, and stigmasterylamine cholesteryl chloride, cholesteryl bromide, androsteryl chloride, androsteryl bromide, β-cholesteryl chloride, β-cholesteryl bromide, epiandroseteryl chloride, epiandrosteryl bromide, ergosteryl chloride, ergosteryl bromide, estryl chloride, esteryl bromide, 11α-hydroxymethylsteryl chloride, 11α-hydroxymethysteryl bromide, 11α-progesteryl chloride, 11α-progesteryl bromide, lanosteryl chloride, lanosteryl bromide, mestranyl chloride, mestranyl bromide, methyltestosteryl chloride, methyltestosteryl bromide, northisteryl chloride, norethisteryl bromide, pregnenoryl chloride, pregnenoryl bromide, β-sitosteryl chloride, β-sitosteryl bromide, stigmasteryl chloride, stigmasteryl bromide, testosteryl chloride and testosteryl bromide, and b is 1 or 2.

5. A polyimide comprising repeating units derived from the polyamic acid of claim 4.

6. An SBE display device or an SH display device having a liquid crystal aligning film formed form the liquid crystal aligning agent recited in claim 4.

7. A liquid crystal aligning agent comprising a polyamic acid having a repeating unit of formula (V)

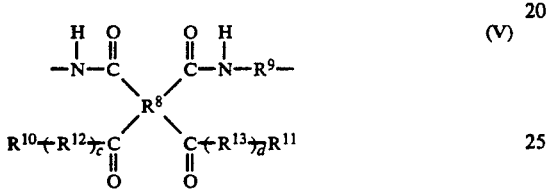

wherein $R^8$ is selected from the group consisting of: butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-tetrahydro-2,5-dioxo-3-furanyl)-naphtho[1,2-c]-furan-1,3-dione, 5-(2,5-dioxotetrahydrofuranyl-3-methyl-3-cyclohexene-1,2-dicarboxylic dianhydride, bicyclo[2,2,2]-oct-7-ene-2,3,5,6-tetracarboxylic dianhydride pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenyl-silanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic)-phenylphosphine oxide dianhydride, p-phenylene-bis(triphenylphthalic) dianhydride, m-phenylene-bis(triphenylphthalic) dianhydride, bis(triphenylphthalic)-4,4'-diphenyl ether dianhydride and bis(triphenylphthalic)-4,4'-diphenylmethane dianhydride;

$R^9$ is selected from the group consisting of: p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 4,4'-diaminodiphenyl ether, 1,5-diaminoaphthalene, 3,3-dimethyl-4,4'-diaminobiphenyl, 4,4'-diaminobenzanilide, 3,4'-diaminodiphenyl ether, 3,3'-diamininobenzophenone, 3,4'-diaminobenzophenone, 4,4'-diaminobenzophenone, 2,2-bis[4-(4-aminophenoxy)phenyl]-propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)-benzene, 9,9-bis(4-aminophenyl)-10-hydroanthracene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl 3,3'-dimethoxy-4,4'-diaminobiphenyl, diaminotetraphenylthiophene 1,1-m-xylylenediamine, 1,2-ethylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0^{2.7}]-undecyclenedimethyldiamine, and a diaminoorganosiloxane of the formula:

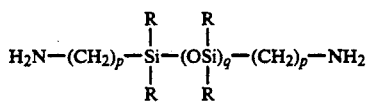

wherein R is a hydrocarbon group having 1 to 12 carbon atoms, a cycloalkyl or aryl group, p is an integer of 1 to 3, and q is an integer of 1 to 20;

each of $R^{12}$ and $R^{13}$ is independently selected from —O— and —NH—;

each of $R^{10}$ and $R^{11}$ is independently a hydroxyl group, or a steroid selected from the group consisting of: androsterone, β-cholesterol, cholesterol, corticosterone acetate, dehydroepiandrosterone, epiandrosterone, ergosterol estrone, 11α-hydroxymethyltestosterone, 11α-hydroxyprogesterone, lanosterol, mestranol, methyltestosterone, $\Delta^{9(11)}$-methyltestosterone, norethisterone, pregsterone, β-sitosterol, stigmasterol, testosterone, chenodeoxycholic chloride, cholic chloride, deoxycholic chloride dehydrocholic chloride, hydroxycholic chloride, ursodeoxycholic chloride, androsterylamine, β-cholesterylamine, cholesterylamine, dehydroepiandrosterylamine, epiandrosterylamine, ergosterylamine, estrylamine, 11α-aminomethyltestosterone, 11α-aminoprogesterone, lanosterylamine, mestranylamine, methyltestosterylamine, $\Delta^{9(11)}$-methyltestosterylamine, norethisterylamine, pregsterylamine, β-sitosterylamine, stigmasterylamine, cholesteryl chloride, cholesteryl bromide, androsteryl chloride, androsteryl bromide, β-cholesteryl chloride, β-cholesteryl bromide, epiandroseteryl chloride, epiandrosteryl bromide, ergosteryl chloride, ergosteryl bromide, estryl chloride, estryl bromide, 11α-hydroxymethylsteryl chloride, 11α-hydroxymethylsteryl bromide, 11α-progesteryl chloride, 11α-progesteryl bromide, lanosteryl chloride, lanosteryl bromide, mestranyl chloride, mestranyl bromide, methyltestosteryl chloride, methyltestosteryl bromide, norethisteryl chloride, norethyisteryl bromide, pregnenoryl chloride, pregnenoryl bromide, β-sitosteryl chloride, β-sitosteryl bromide, stigmasteryl chloride, stigmasteryl bromide, testosteryl chloride and testosteryl bromide and hydroxyl; provided that at least one of $R^{10}$ or $R^{11}$ is a steroid, and c and d are independently 0 or 1.

8. An SBE or SH display device having a liquid crystal aligning film formed from the liquid crystal aligning agent of claim 7.

9. A polyamic acid liquid crystal aligning agent according to either claim 1 or claim 7 wherein the tetracarboxylic dianhydride is selected from the group consisting of: butane tetracarboxylic dianhydride, 1,2,3,4-cyclobutane tetracarboxylic dianhydride, 2,3,5-tricarboxy cyclopentyl acetic dianhydride, 5-(2,5-dioxotetrahydrofural)-3-methyl-3-cyclohexane-1,2-dicarboxylic dianhydride, and 1,3,3a,4,5,9b-hexahydro-5-(tetrahydro-2,5-dioxo-3-furanyl)naphthol]1,2-c]-furan-1,3-dione.

10. A polyamic acid liquid crystal aligning agent according to claim 1 or claim 7 wherein the tetracarboxylic dianhydride is 2,3,5-tricarboxycyclopentyl acetic dianhydride.

11. A polyamic acid liquid crystal aligning agent as in claim 1, wherein the dinitro compound reduced to a diamine of Formula (II) is selected from the group consisting of: 2,4-dinitrobenzoyl chloride, 3,5-dinitrobenzoyl chloride, 2,4-dinitrophenol, 2,5-dinitrophenol, 6-chloro-2,4-dinitroaniline, 2,4-dinitroaniline, 3,5-dinitrochlorobenzene, and 2-chloro-3,5-dinitropyridine.

12. A polyamic acid liquid crystal aligning agent according to claim 1 or claim 7 wherein the diamine is selected from the group consisting of: p-phenylenediamine, 4,4'-diaminodiphenylmethane, 4,4'-diaminodiphenylether, 2,2-bis[4-(4-aminophenoxy)phenyl]propane, 9,9-bis(4-aminophenyl)fluorene, 2,2-bis[4-(4-aminophenoxy)phenyl]hexafluoropropane, and 2,2-bis(4-aminophenyl)hexafluoropropane.

13. A polyamic acid liquid crystal aligning agent as in claim 4, wherein the nitro compound reduced to form a monoamine of Formula (IV) is selected from the group consisting of: p-nitrobenzoyl chloride, p-nitrophenol, p-nitroaniline, p-nitrochlorobenzene, p-nitrobromobenzene, and p-nitrofluorobenzene.

14. A polyamic acid liquid crystal aligning agent according to claim 1 or claim 7 wherein the steroid is selected from the group consisting of: cholesterol, β-cholesterol, cholic chloride, dehydrocholic chloride, β-cholesterylamine, cholesterylamine, β-cholesteryl chloride, and β-cholesteryl bromide, cholesteryl chloride and cholesteryl bromide.

15. An SBE display device or an SH display device having a liquid crystal aligning film formed from the liquid crystal aligning agent in claim 2.

16. An SBE display device or an SH display device having a liquid crystal aligning film formed from the liquid crystal aligning agent in claim 5.

* * * * *